Figures 1, 2:
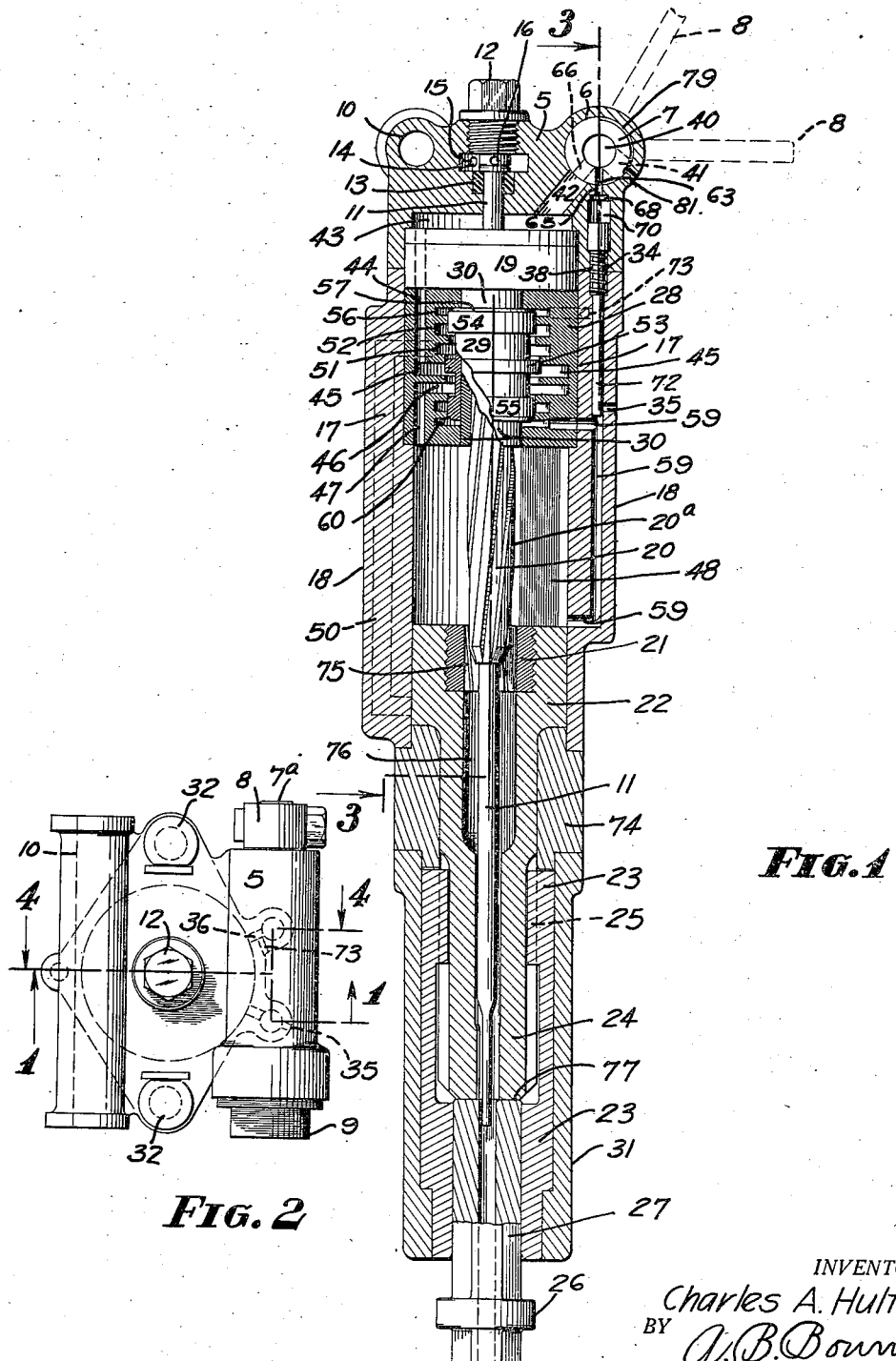

April 13, 1937.  C. A. HULTQUIST  2,076,644
PNEUMATIC ROCK DRILL
Original Filed Oct. 22, 1934  3 Sheets-Sheet 1

INVENTOR.
Charles A. Hultquist
BY
A.B.Bowman
ATTORNEY

April 13, 1937.  C. A. HULTQUIST  2,076,644
PNEUMATIC ROCK DRILL
Original Filed Oct. 22, 1934  3 Sheets-Sheet 2

INVENTOR.
Charles A. Hultquist
BY A.B.Bowman
ATTORNEY.

April 13, 1937.   C. A. HULTQUIST   2,076,644
PNEUMATIC ROCK DRILL
Original Filed Oct. 22, 1934   3 Sheets-Sheet 3

INVENTOR.
Charles A. Hultquist
BY
A. B. Bowman
ATTORNEY.

Patented Apr. 13, 1937

2,076,644

UNITED STATES PATENT OFFICE 2,076,644

PNEUMATIC ROCK DRILL

Charles A. Hultquist, San Gabriel, Calif., assignor to Independent Pneumatic Tool Co., Chicago, Ill., a corporation of Delaware Application October 22, 1934, Serial No. 749,411
Renewed May 26, 1936

9 Claims. (Cl. 121—28)

My invention relates to pneumatic rock drills, more particularly to mechanism used in combination with rock drills for blowing the drill cuttings and the like from the drill holes when drilling in rock or other material.

It has heretofore been the custom in pneumatic rock drills of this class when blowing the drill cuttings from the drill holes to waste a large proportion of the air by passing it out through the leak holes of the drill, thus wasting a large quantity of air and at the same time reducing the efficiency or quantity of air delivered to the drill hole through the drill.

The objects of my invention are:

First, to provide a pneumatic drill in which there are no open holes or other leak places through which the compressed fluid is wasted when used for blowing the drill cuttings out of the drill holes;

Second, to provide a pneumatic rock drill of this class in which the hammer is stationary during the blowing operation and the full receiver pressure is delivered into the drill hole in the drill steel for blowing the cuttings from the drill hole, therefore providing a highly efficient and effective means of clearing the drill hole of cuttings or the like;

Third, to provide a pneumatic rock drill of this class that is very economical in its use of the compressed air while at the same time providing a maximum drilling speed that is economical of maintenance and easy and convenient to operate;

Fourth, to provide a pneumatic rock drill of this class with plunger valve means cooperative with the conventional rock drill structure for adding efficiency to the blowing of cuttings from the drill hole and economy of air used in this operation; and Fifth, to provide a pneumatic rock drill of this class which is very simple and economical of construction, easy to operate, efficient in its action throughout all of its operations, and which will not readily deteriorate or get out of order.

Figure 3:
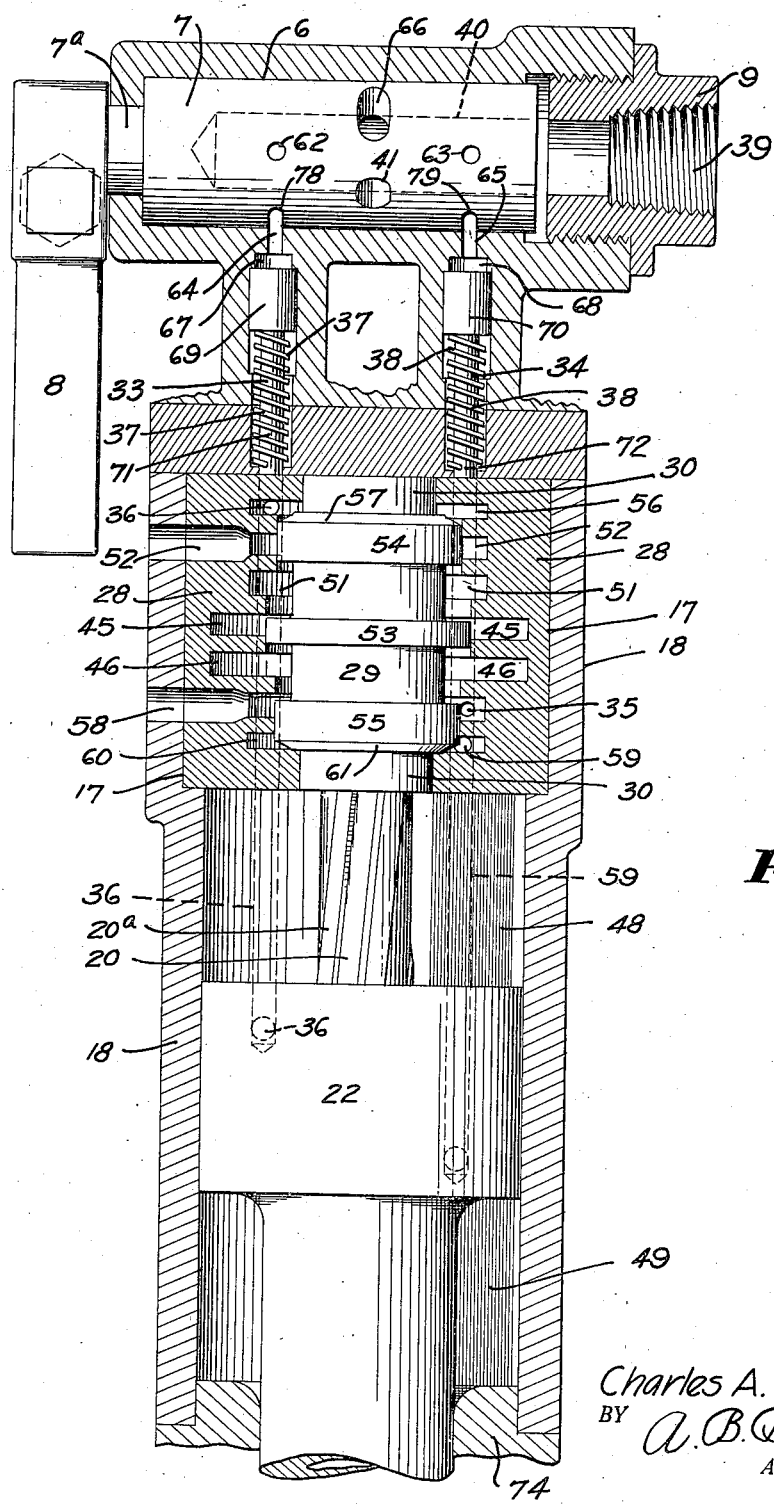
Figure 4:
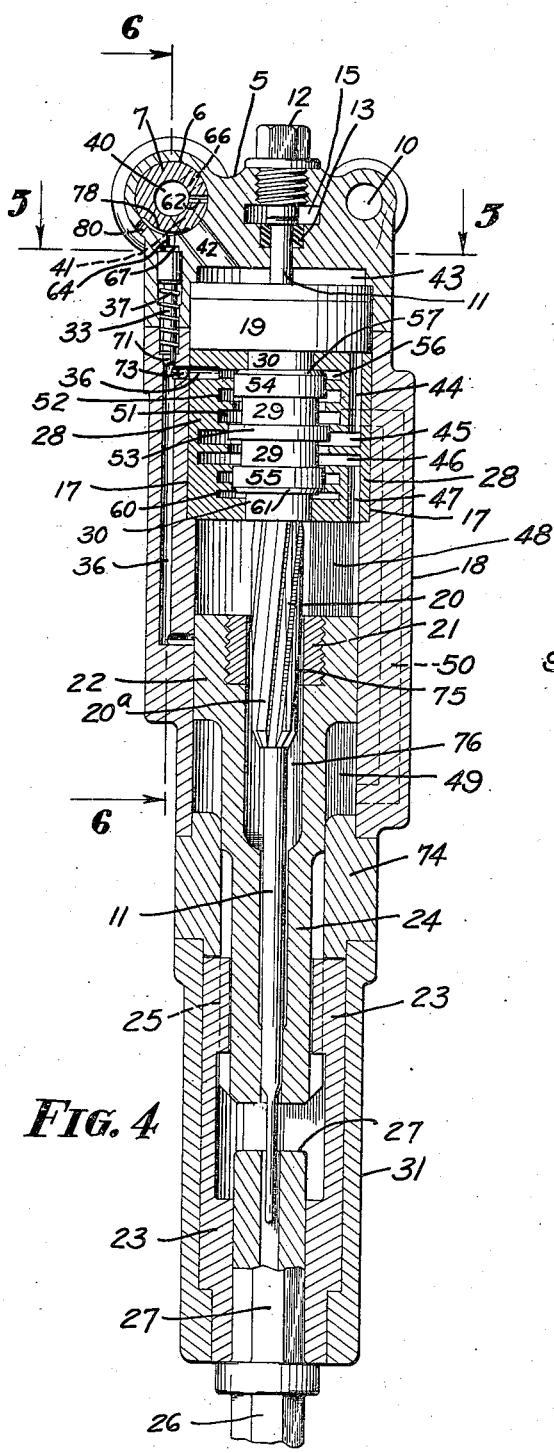
Figure 5:
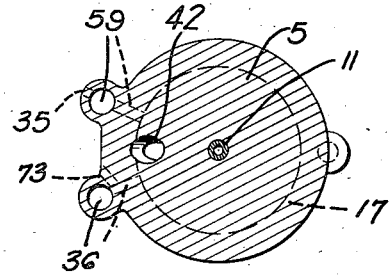
Figure 6:
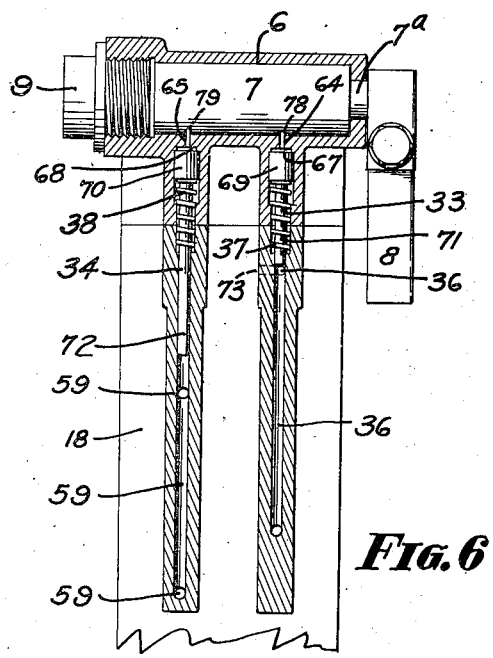

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a longitudinal sectional view of my pneumatic rock drill complete through 1—1 of Fig. 2 showing some of the parts in elevation to facilitate the illustration and showing by dotted lines varying positions of the throttle operating handle, and showing the drill in blowing position with the piston 22 held stationary on the end of the front bearing 14 and the hammer end 24 resting on the face of the steel shank 27; Fig. 2 is a back end view thereof; Fig. 3 is a fragmentary sectional view substantially along the line 3—3 of Fig. 1 on an enlarged scale showing some of the parts in elevation to facilitate the illustration, and showing the hammer piston 22 on its return stroke in drill operating position; Fig. 4 is a longitudinal sectional view on approximately the same scale as that of Fig. 1 of my pneumatic rock drill complete along the line 4—4 of Fig. 2 and showing some of the parts and portions in elevation to facilitate the illustration, and showing the drill in drilling position with the hammer piston 22 on its downward or working stroke; Fig. 5 is a transverse sectional view through the back head along the line 5—5 of Fig. 4, and Fig. 6 is a fragmentary longitudinal sectional view through 6—6 of Fig. 4 showing some of the parts and portions in elevation to facilitate the illustration.

Similar characters of reference refer to similar parts and portions throughout the several views of the drawings.

As in the conventional rock drill of this class my rock drill is provided with a back head 5 at the back end of the rock drill and it is provided in one side with a throttle bearing 6 in which there is revolubly mounted a throttle valve member 7 which is provided with an extended portion 7a and on which is mounted an operating handle 8 which handle is shown in its operating position in Figs. 2 and 3 of the drawings, and in its inoperative position and its drill hole blowing position by dotted lines in Fig. 1 of the drawings. Screwed into the opposite end of the throttle bearing 6 from the handle 8 is an air inlet spud 9, shown best in Figs. 3 and 6 of the drawings, into which may be screwed the air hose or other air conductor from the air compressor or tank.

The back head 5 is also provided on the opposite side from the throttle 7 with a hole 10 which is adapted for a handle for supporting the drill during the drilling operation. Mounted centrally in this back head 5 and extending forwardly to near the opposite end of the drill is a water tube 11 which is held in a fixed position in the back head 5 by the back plug 12 and rubber washer 13, shown best in Figs. 1 and 4 of the drawings. This back head 5 is also provided with a water duct 14 for conducting water into a groove 15 in said back head 5 then through the duct 16 into the water tube 11. Mounted partly in the back head 5 and partly in the counter bore 17 in the rear cylinder 18 which is positioned adjacent to said back head is a ratchet mechanism 19 which is of conventional type for rock drills of this class and which is composed of the conventional ratchet ring, pawls, springs, and the head of the rifle bar 20, not shown.

This rifle bar 20 is provided with a plurality of helical flutes 20a which engage conforming helical ridges cut in the rifle nut 21 which rifle nut is screwed into the piston 22 at its back end and surrounding said rifle bar 20. This construction provides the hammer piston 22 with a rotating movement when it travels back and forth in the cylinder 18 and this rotating movement of the hammer piston 22 is conveyed to the chuck driver 23 by means of flutes cut on the hammer extension 24 and which engage notches 25 in the chuck driver 23. This in turn rotates the drill steel 26 which is supported in the chuck driver 23 by a hexagon shank 27.

Mounted in the enlarged counter bore 17 in the cylinder 18 is a valve chest 28 in which reciprocates a tubular distributing or control valve 29. This control valve 29 rides on a bearing 30 which is also tubular and fits loosely on the rifle bar 20.

At the front portion of my pneumatic rock drill there is provided a front head 31. The back head 5 and this front head 31 and the intermediate parts are held in rigid alinement by two side bolts 32 which pass through perforated lugs in the back head 5 and the front head 31, which bolts are shown only in Fig. 2 of the drawings as they are conventional supporting bolts.

It will also be noted that the structure so far described in detail is substantially of conventional form of pneumatic rock drills of this class but is necessary for cooperative relation with the novel portion of my pneumatic rock drill structure described hereinafter.

Applicant has provided in the back head 5 and rear cylinder 18 plunger valves 33 and 34, shown best in Fig. 6 of the drawings, which are adapted to close the leak hole 35 and valve operating port 36 in the rear cylinder 18, as shown best in Fig. 6 of the drawings, for saving the compressed fluid during the blowing of drill cuttings from the drill hole. These plunger valves 33 and 34 consist of plunger members 71 and 72 which are adapted to fill and reciprocate in the ports 36 and 59, respectively, and each of the plunger valves is provided with a spring, designated 37 and 38, respectively, which are mounted in bores in the back head 5 and rest on shoulders in said back head, as shown best in Figs. 3 and 6 of the drawings. The plungers 71 and 72 are also provided with pistons 69 and 70 which are mounted in enlarged bores in the back head 5, as shown best in Figs. 3 and 6 of the drawings. Backwardly of the pistons 69 and 70 are provided reduced air receiving bores 67 and 68 which are adapted to receive air through ports 64 and 65 in the back head 5 through openings 62 and 63 in the throttle 7 which receive their air through port 40, all as shown best in Figs. 1 and 3 of the drawings.

The operation of my drill for the ordinary drilling purposes is as follows: It will be noted that Figs. 3 and 4 show the drill for drilling purposes. The plunger valves 33 and 34 are held in their rearward position by springs 37 and 38. Fluid under pressure enters through threaded openings 39 in the air inlet spud 9 into the hollow open portion 40 of the throttle valve 7. Then it passes through the main supply port 41 to the back head port 42 and into the chamber 43. Then through the ports 44 into the central groove 45 in the valve chest 28 and then the fluid is distributed by the distributing valve 29. In Fig. 4 the valve 29 is in its rearward position and the fluid passes from the groove 45 into the groove 46 and the port 47 into the rear end 48 of the cylinder bore which drives the piston 22 forwardly on its working stroke. At the same time the front end 49 of the cylinder bore is exhausting through the cylinder ports 50, groove 51, and exhaust ports 52.

It will be here noted that the valve 29 is held in its position by the greater pressure against the central ridge 53 and this ridge is larger in diameter than the ridges 54 and 55.

While on its forward travel the piston 22 uncovers the valve operating port 36. Fluid now flows from the rear cylinder bore 48 through the port 36 into the groove 56. This pressure acts on the pressure surface 57 and causes the valve 29 to shift to the forward position, as shown in Fig. 3 of the drawings. The rear cylinder bore 48 is now exhausting through the port 47, groove 46 and exhaust ports 58. Live pressure is now flowing into the front cylinder bore 49 from the central groove 45, through the groove 51 and port 50. After the hammer extension 24 has delivered the blow on the end of the steel shank 27 the piston 22 will start on its return stroke and continue rearwardly until valve operating port 59 is uncovered. Fluid will then flow through the port 59 into groove 60 and act on the pressure surface 61. This shifts the valve 29 to its rearward position and causes the piston 22 to again travel forwardly.

These actions of the different parts will continue as long as the drill is in its drilling position and the fluid under pressure flows into the groove 45.

The operation for blowing cuttings from the drill hole is as follows: Fig. 1 shows the position of the hammer and other operating parts for this operation. The operating handle 8 is turned to a position at right angles to the longitudinal axis of the drill, as shown by one position in Fig. 1 of the drawings which is the horizontal position on the drawings. In this position the ducts 62 and 63 in the throttle valve 7 coincide with the ducts 64 and 65 and the fluid supply port 66 coincides with the port 42. The fluid now flows through the port 42 into the central groove 45 in the valve chest 28. Fluid also flows through the ducts 62 and 63 and 64 and 65 into the bores 67 and 68. This acts on the pistons 69 and 70 and presses them forward to their limited position, as shown in Fig. 1, and it will be noted that in Fig. 1 the plunger 72 has closed the leak hole 35 while fluid from the rear cylinder bore 48 flows through the port 59 into the groove 60 and holds the valve 29 in its rearward position. At the same time the plunger 71 has closed the valve operating port 36 from communicating with the groove 56 but the leak port 73 remains open to the atmosphere as best shown in Fig. 4. It will thus be seen that no fluid under pressure can be wasted through the leak holes 35 and 73; that the valve 29 is held securely in its rearward position; that the hammer piston 22 is resting against the front bearing 74. This equalizes the upward and downward pressure in the cylinder and eliminates all tendency to push the drill upward during blowing operations. The rifle nut 21 has grooves 75 through which the compressed fluid flows into the hollow portion 76 of the hammer piston 22, thence along the tube 11 until the fluid enters the hollow steel 26 for blowing the drill cuttings from the drill hole.

It will be here noted that the leakage between the faces of the hammer and steel at 77 is very small. It will therefore be seen that this is a very efficient way of blowing the cuttings from the hole. After the blowing is completed the throttle handle 8 is turned until it is in a position parallel with the longitudinal axis of the drill or drilling position; the fluid pressing on the pistons 69 and 70 is exhausted through the grooves 78 and 79 and vent holes 80 and 81. Then the springs 37 and 38 return the plunger valves 33 and 34 to their rearward position and the drilling operation is resumed.

Though I have shown and described a particular construction, combination and arrangement of parts and portions, I do not wish to be limited to this particular construction, combination and arrangement but desire to include in the scope of my invention, the construction, combination and arrangement substantially as set forth in the appended claims.

Having thus described my invention, what I claim as new and desire to secure by Letters Patent is:

1. In a pneumatic rock drill in which there is a back head a throttle therein, a back cylinder with leak holes and distributing valve in said back cylinder, the combination with said back head, throttle, back cylinder with leak holes and distributing valve, of throttle controlled fluid pressure operated leak hole valves in said back head in operative relation with said leak holes and said throttle for closing the same during the blowing operation of said rock drill.

2. In a pneumatic rock drill in which there is a back head a throttle therein, a back cylinder with leak holes and distributing valve in said back cylinder, the combination with said back head, throttle, back cylinder with leak holes and distributing valve, of throttle controlled fluid pressure operated leak hole valves in said back head in operative relation with said leak holes and said throttle for closing the same during the blowing operation of said rock drill, and means in said throttle for regulating said leak hole valves.

3. In a pneumatic rock drill in which there is a back head a throttle therein, a back cylinder with leak holes and distributing valve in said back cylinder, the combination with said back head, throttle, back cylinder with leak holes and distributing valve, of throttle controlled fluid pressure operated leak hole valves in said back head in operative relation with said leak holes and said throttle for closing the same during the blowing operation of said rock drill, said leak hole valves including compressed air cylinders, pistons mounted therein, plunger members secured to said pistons reciprocally mounted in ports communicating with said leak holes, and springs mounted around said plungers in engagement with said pistons tending to return said pistons to backward position.

4. In a pneumatic rock drill in which there is a back head a throttle therein, a back cylinder with leak holes and distributing valve in said back cylinder, the combination with said back head, throttle, back cylinder with leak holes and distributing valve, of throttle controlled fluid pressure operated leak hole valves in said back head in operative relation with said leak holes and said throttle for closing the same during the blowing operation of said rock drill, and means in said throttle for regulating said leak hole valves, said means in said throttle including ports communicating with the interior of said throttle and positioned to communicate with said leak hole valves when said throttle is turned to a certain position.

5. In a pneumatic rock drill in which there is a back head a throttle therein, a back cylinder with leak holes and distributing valve in said back cylinder, the combination with said back head, throttle, back cylinder with leak holes and distributing valve, of throttle controlled fluid pressure operated leak hole valves in said back head in operative relation with said leak holes and said throttle for closing the same during the blowing operation of said rock drill, said leak hole valves including compressed air cylinders, pistons mounted therein plunger members secured to said pistons reciprocally mounted in ports communicating with said leak holes, springs mounted around said plungers in engagement with said pistons tending to return said pistons to backward position, and means in said throttle for regulating said leak hole valves, said means in said throttle including ports communicating with the interior of said throttle and positioned to communicate with said leak hole valves when said throttle is turned to a certain position.

6. In a pneumatic rock drill in which there is a back head a throttle therein, a back cylinder with leak holes and a distributing valve in said back cylinder, the combination with said back head, throttle, back cylinder with leak holes and distributing valve, of throttle controlled fluid pressure operated leak valve means in said back head in operative relation with said leak holes and said throttle for closing said leak holes when said throttle is turned to a certain position.

7. In a pneumatic rock drill in which there is a back head a throttle therein, a back cylinder with leak holes and a distributing valve in said back cylinder, the combination with said back head, throttle, back cylinder with leak holes and distributing valve, of throttle controlled fluid pressure operated leak valve means in said back head in operative relation with said leak holes and said throttle for closing said leak holes when said throttle is turned to a certain position, and means for returning said valve means to inoperative position relative to said leak holes when said throttle valve is turned to a different position.

8. In a pneumatic rock drill in which there is a back head a throttle therein, a back cylinder with leak holes and a distributing valve in said back cylinder, the combination with said back head, throttle, back cylinder with leak holes and distributing valve, of throttle controlled fluid pressure operated leak valve means in said back head in operative relation with said leak holes and said throttle for closing said leak holes when said throttle is turned to a certain position, and means for returning said valve means to inoperative position relative to said leak holes when said throttle valve is turned to a different position, the same throttle adapted to control said leak hole valves and control the distributing valve.

9. In a pneumatic rock drill in which there is a back head a throttle therein, a back cylinder with leak holes and a distributing valve in said back cylinder, the combination with said back head, throttle, back cylinder with leak holes and distributing valve, of throttle controlled fluid pressure operated leak valve means in said back head in operative relation with said leak holes and said throttle for closing said leak holes when said throttle is turned to a certain position, and means for returning said valve means to inoperative position relative to said leak holes when said throttle valve is turned to a different position, the same throttle adapted to control said leak hole valves and control the distributing valve, said leak hole valves being so arranged in the operating ports of said rock drills to control the position of said distributing valve and the hammer of said drill, while said leak hole valves are in operative position in relation to said leak holes.

CHARLES A. HULTQUIST.